US007737884B2

(12) United States Patent
Haberland et al.

(10) Patent No.: US 7,737,884 B2
(45) Date of Patent: Jun. 15, 2010

(54) METHOD FOR THE OPERATION OF A RADAR SYSTEM

(75) Inventors: Udo Haberland, Holzgerlingen (DE); Urs Luebbert, Bietigheim-Bissingen (DE)

(73) Assignee: Valeo Schalter und Sensoren GmbH, Bietigheim-Bissingen (DE)

(*) Notice: Subject to any disclaimer, the term of this patent is extended or adjusted under 35 U.S.C. 154(b) by 0 days.

(21) Appl. No.: 12/119,904

(22) Filed: May 13, 2008

(65) Prior Publication Data
US 2008/0211708 A1 Sep. 4, 2008

Related U.S. Application Data

(63) Continuation of application No. PCT/EP2006/009326, filed on Sep. 26, 2006.

(30) Foreign Application Priority Data

Nov. 29, 2005 (DE) .................. 10 2005 056 800

(51) Int. Cl.
 G01S 7/40 (2006.01)
 G01S 13/00 (2006.01)
 G01S 13/32 (2006.01)
 G01S 13/93 (2006.01)

(52) U.S. Cl. .................. 342/173; 342/27; 342/70; 342/118; 342/128; 342/165; 342/174; 342/175; 342/195

(58) Field of Classification Search .................. 342/27, 342/28, 59, 70–72, 118, 128–133, 165–175, 342/195; 180/167–169; 701/300, 301
See application file for complete search history.

(56) References Cited

U.S. PATENT DOCUMENTS

| 5,945,942 | A | * | 8/1999 | Artis et al. | 342/165 |
| 6,147,637 | A | * | 11/2000 | Morikawa et al. | 342/70 |
| 6,278,399 | B1 | * | 8/2001 | Ashihara | 342/173 |
| 6,369,747 | B1 | * | 4/2002 | Ashihara | 342/70 |
| 6,414,623 | B1 | * | 7/2002 | Ashihara | 342/70 |

(Continued)

FOREIGN PATENT DOCUMENTS

DE    100 59 673 A1    6/2002

(Continued)

OTHER PUBLICATIONS

Skolnik, Merrill I., Radar Handbook, Second Edition, 1990, S.14.27-S.14.28, ISBN 0-07-057913-X, McGraw-Hill, Inc., New York, United States.

(Continued)

*Primary Examiner*—Bernarr E Gregory
(74) *Attorney, Agent, or Firm*—Henry M. Feiereisen; Ursula B. Day

(57) ABSTRACT

The invention relates to a method for operating a radar system (100) especially of a motor vehicle (200), comprising at least one first sensor module (110a) and at least one additional sensor module (110b). A detection range (A) of the first sensor module (100a) at least partly overlaps a detection range (B) of the additional sensor module (110b) while the first sensor module (100a) receives a transmit signal transmitted by the additional sensor module (110b) in a monitoring mode (305) in order to obtain information about the operating condition of the additional sensor module (110b).

20 Claims, 3 Drawing Sheets

U.S. PATENT DOCUMENTS

| | | | |
|---|---|---|---|
| 6,414,628 B1 * | 7/2002 | Ashihara | 342/173 |
| 6,469,659 B1 * | 10/2002 | Lajiness et al. | 342/173 |
| 6,611,227 B1 * | 8/2003 | Nebiyeloul-Kifle et al. | 342/173 |
| 6,646,589 B2 * | 11/2003 | Natsume | 342/70 |
| 6,825,799 B2 * | 11/2004 | Isaji | 342/173 |
| 6,831,595 B2 * | 12/2004 | Isaji | 342/173 |
| 6,975,265 B2 * | 12/2005 | Schlick et al. | 342/165 |
| 7,012,560 B2 * | 3/2006 | Braeuchle et al. | 342/70 |
| 7,151,482 B2 * | 12/2006 | Natsume et al. | 342/173 |
| 7,218,208 B2 * | 5/2007 | Kikuchi | 342/70 |
| 7,271,762 B2 * | 9/2007 | Samukawa et al. | 342/173 |
| 7,301,496 B2 * | 11/2007 | Honda et al. | 342/70 |
| 2003/0151543 A1 * | 8/2003 | Nakanishi et al. | 342/70 |
| 2003/0151544 A1 * | 8/2003 | Nishimura et al. | 342/70 |
| 2007/0013576 A1 * | 1/2007 | Shingyoji et al. | 342/70 |
| 2007/0115168 A1 * | 5/2007 | Honda | 342/173 |

FOREIGN PATENT DOCUMENTS

| | | |
|---|---|---|
| DE | 102 60 434 A1 | 7/2004 |
| DE | 698 29 794 T2 | 11/2005 |
| DE | 10 2005 056 800 A1 | 5/2007 |
| EP | 0 918 232 A2 | 5/1999 |
| EP | 1 026 514 A2 | 8/2000 |
| WO | WO 98/47022 | 10/1998 |
| WO | WO 2007/062708 A1 | 6/2007 |

OTHER PUBLICATIONS

International Search Report for PCT/EP2006/009326.
Search Report for DE 10 2005 056 800.9.

* cited by examiner

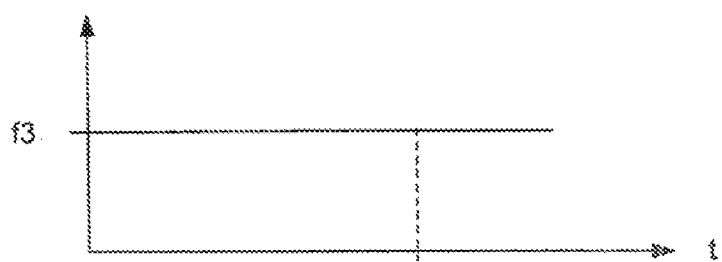
Fig. 3a
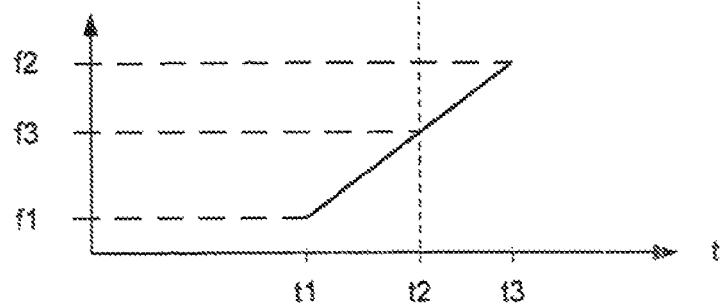
Fig. 3b
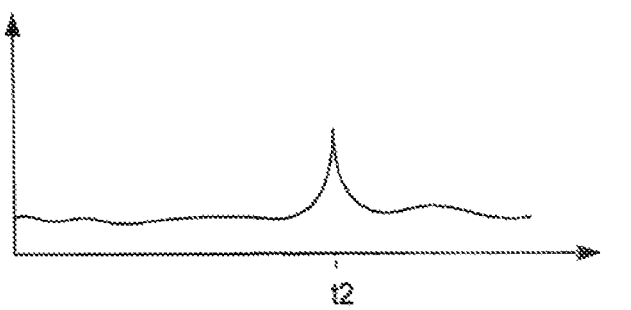
Fig. 3c
Fig. 4
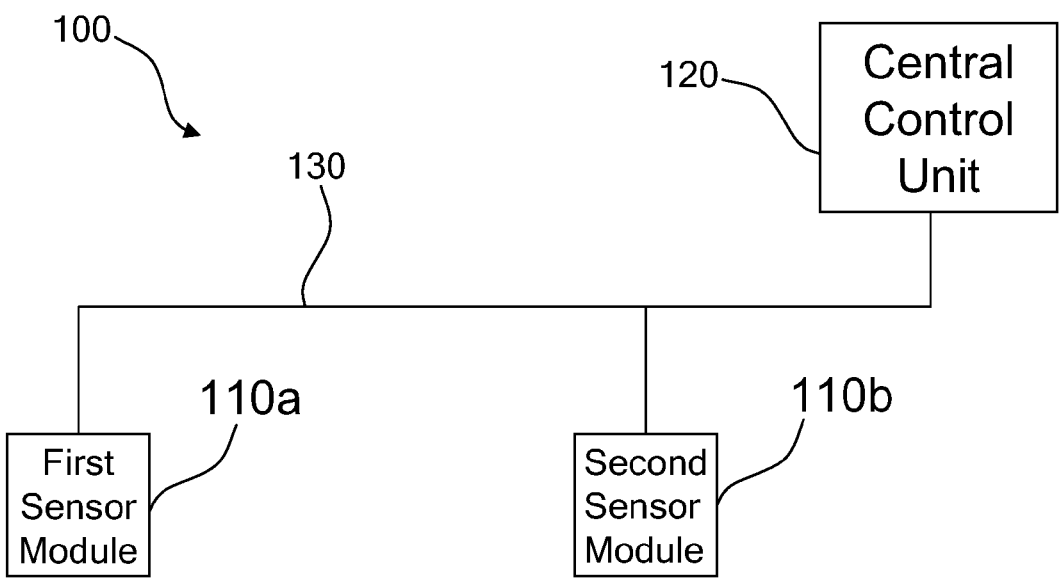

METHOD FOR THE OPERATION OF A RADAR SYSTEM

CROSS-REFERENCE TO RELATED APPLICATIONS

This application is a continuation of International Application No. PCT/EP2006/009326 filed on Sep. 26, 2006, which claims the benefit of DE 10 2005 056 800.9, filed Nov. 29, 2005. The disclosures of the above applications are incorporated herein by reference.

FIELD

The invention relates to a radar system for use in a motor vehicle, a control system for use with a radar system, a computer program for use with a radar system, and a method of operating a radar system in a motor vehicle.

BACKGROUND

The statements in this section merely provide background information related to the present disclosure and may not constitute prior art.

Methods and systems are used in driver assistance systems for motor vehicles in order to monitor the peripheral environment of a motor vehicle and/or to support or to supplement additional systems, such as so-called lane-departure warning systems or other driver assistance systems.

A disadvantage of the known methods and systems is the complexity of synchronizing the plurality of sensor modules that are necessary for reliable operation of this kind of radar system, particularly so that the plurality of sensor modules do not interfere with each other during their operation.

Synchronization is typically achieved with dedicated synchronization lines, which require an undesirable expense for material and assembly due to the corresponding cabling, thereby increasing the overall cost of the radar system.

Synchronization may also be achieved with an existing data bus for networking the individual sensor modules, wherein the data bus is used to transmit the signals necessary for synchronization. This solution has the disadvantage that the latency periods of most bus systems are too long to allow precise synchronization. Furthermore, in these kinds of systems, the bus load increases accordingly because of the transmitted synchronization information, so that at times, other communication via the data bus might only be possible to a limited extent.

SUMMARY

The present disclosure provides a method and a radar system that is configured to enable simple, cost-efficient, and flexible synchronization of a plurality of sensor modules.

In one form, a detection range of a first sensor module overlaps at least in part a detection range of a second sensor module. The first sensor module receives, in a monitoring mode, a transmit signal emitted by the second sensor module, in order to receive information on the operating state of the second sensor module.

This means that in contrast to known radar systems with a plurality of sensor modules, in which the detection ranges of the different sensor modules are designed in such a way that they do not mutually overlap, in order to exclude influencing each other, it is inventively proposed that this kind of overlapping be deliberately established and exploited so that the first sensor module, in its monitoring mode, receives a transmit signal emitted by an additional sensor module. In this way, it is possible, for example, using the inventive operating method, for the first sensor module, by evaluating the transmit signal originating from the additional sensor module, to obtain information on the operating state of the additional sensor module. In that way, the first sensor module can adjust in a particularly advantageous manner its own transmission and reception activity to the operating state of the additional sensor module.

In that way, the first sensor module can be operated in a particularly advantageous manner depending on the information on the operating state of the additional sensor module.

In some forms of the method of the present disclosure, the method provides for an FMCW (frequency modulated continuous wave) signal to be used as the transmit signal, in which case the frequency is temporally varied between a start frequency and a stop frequency.

With these transmit signals, also termed chirp signals, the frequency of the transmit signal, based on the start frequency, is increased, in some forms, in a temporally linear manner, for example, so that the chirp signal is fully defined through the specification of its start frequency, its stop frequency, and its signal duration.

In addition, it is also possible to use chirp signals as transmit signals that feature no time-linear variation in frequency. What is more, so-called stepped FMCW, up-down FMCW, other chirp signals, or completely general FSK signals or combinations of them can be used as transmit signals.

Another form of the method of the present disclosure provides for a receiver of the first sensor module, in the monitoring mode, to analyze only received signals with a frequency that lies between the start frequency of the FMCW signal and the stop frequency of the FMCW signal. This considerably reduces the complexity of monitoring the transmit signal originating from an additional sensor module by the first sensor module. In addition, this measure also reduces the susceptibility of the radar system of the present disclosure to interference, because no analysis of transmit signals other than those necessary for synchronization takes place.

For example, a voltage controlled oscillator (VCO) provided in the receiver of the first sensor module, which generates a mixed signal for mixing down a received transmit signal, can be adjusted in such a way in the monitoring mode of the present disclosure that it is operated at a constant frequency that lies within the frequency range defined by the start frequency and the stop frequency of the FMCW transmit signal. It is then guaranteed that an FMCW signal emitted as a transmit signal by the additional sensor module at least for a brief period of time has the same frequency as the voltage-controlled oscillator of the receiver of the first sensor module, so that at least at this point in time the transmit signal is registered by the first sensor module, or by its receiver.

On the basis of reception time and the frequency of the transmit signal received, which in this case corresponds to the frequency of the local voltage-controlled oscillator, as well as on the basis of knowledge of the type of transmit signal used by the additional sensor module, the first sensor module can deduce a starting point in time when the additional sensor module began to emit the initial start signal, or, as the case may be, the end point at which the additional sensor module stopped emitting the transmit signal. On the basis of this data, a very precise synchronization of the first sensor module with the additional sensor module can be carried out.

If all of the sensor modules of the radar system of the present disclosure are configured in the same way, and in particular use the same transmit signals, a synchronization of the sensor modules can be achieved in a particularly simple manner using the method of the present disclosure.

Another form of the method of the present disclosure provides for the first and/or the additional sensor module to be a radar sensor with a controllable directional pattern. This kind of controllable directional pattern can be achieved, for example, by means of a plurality of phase-controlled antennas, also called a phased array, and for example enables the respective radar sensor or the respective sensor module to monitor only a small part of its total detection range per unit time, whereby, among other things, a correspondingly higher spatial resolution is achieved in obstacle detection, for example in the vicinity of a motor vehicle.

In some forms, the detection ranges of the different sensor modules are hereby arranged in such a way that they overlap in only a relatively small spatial area. In this case, by means of selective formation of the directional pattern of the radar sensor or its antennas, it is still possible to carry out the synchronization of the present disclosure through monitoring of a transmit signal of an adjacent sensor module, while the risk of unintentional reciprocal interference of adjacent sensor modules is largely ruled out, particularly if the directional pattern of the respective radar sensor do not extend into the overlap area. In other words, in some forms, the directional patterns of the respective radar sensors do not extend into the overlap area.

For example, a sensor module can cyclically survey its entire detection range by adjusting a relatively narrow main lobe for the directional pattern of its radar sensor, which is swept successively over the different partial areas of the entire detection range. In this variation of the present disclosure, actual overlapping of the detection ranges of adjacent sensor modules occurs only at points in time when the respective main lobes of adjacent radar sensors engage the partial areas of their detection ranges that lie within the overlapping area of the detection ranges of the adjacent sensor modules.

In this case, the synchronization of a sensor module with an adjacent sensor module can take place, for example, by having the sensor module enter its monitoring mode for a pre-defined period of time, during which it advantageously monitors only the overlapping area. As soon as a transmit signal of the adjacent sensor module, which cyclically surveys its detection range and accordingly also periodically acts on the overlapping area with its transmit signal, is detected by the sensor module that is to be synchronized, the synchronization of the present disclosure occurs.

In some forms of the method of the present disclosure, the sensor module is periodically shifted into the monitoring mode, so that any inaccuracies in a local time base of a sensor module will not lead to a complete loss of synchronization among a plurality of sensor modules, because the periodic assumption of the monitoring mode enables regular calibration.

A sensor module can also be shifted into its monitoring mode when the module, during normal operation, for example when detecting an obstacle, has picked up or analyzed crosstalk or other interference that indicates unintentional reception of a transmit signal from an adjacent sensor module, and thus a loss of synchronization.

In another form of the method of the present disclosure, the sensor module is shifted into the monitoring mode immediately after activation. In that way, a sensor module that is not initially synchronized with its adjacent sensor module may quickly be synchronized therewith.

In some forms of the method of the present disclosure, a sensor module leaves the monitoring mode after a pre-defined holding time or after a randomly determined holding time. Thus, in the event of a total failure of an adjacent sensor module, one function of the sensor module, such as distance determination, obstacle detection or the like will occur, even when no synchronization with the non-functioning sensor module is possible.

The provision of a randomly determined holding time largely excludes the possibility that adjacent sensor modules that were activated at the same time will leave their monitoring mode at the same time to defeat reciprocal synchronization. The likelihood of two simultaneously activated sensor modules leaving their monitoring mode at the same point in time is relatively small. It is therefore highly likely that one of the two sensor modules, for example, will enter normal operation at the end of its randomly determined holding time, performing its main function of obstacle recognition or similar function. The other adjacent sensor module remains as before in the monitoring mode, because its randomly determined holding time has not yet run out. Accordingly, this additional sensor module can synchronize with the adjacent sensor module, which is already in its normal operating state.

In another form of the method of the present disclosure, it is provided that the transmit signal emitted by the additional sensor module be used in the additional sensor module to measure a distance between the additional sensor module and an object situated within the detection range of the additional sensor module. This means that in order to synchronize according to the inventive method a sensor module which is in its monitoring mode with an adjacent sensor module, it is not necessary for the adjacent sensor module to emit a special transmit signal that does not enable detection of an obstacle or the like. Rather, the adjacent sensor module can maintain its normal operating state and emit the transmit signals required for its functionality, such as FMCW transmit signals, for example. In that way, during the synchronization of a sensor module, at least restricted operation of the radar system occurs, in that sensor modules that are not in a monitoring mode can collect data concerning any obstacles or similar phenomena that might be present.

Another form of the method of the present disclosure provides for the additional sensor model to transmit a special signal containing synchronization information in the detection range of the first sensor module, or into the overlapping area of the detection range of the adjacent sensor module. With this variant of the method, especially interference-resistant synchronization information or other data can be transmitted by the additional sensor module to the sensor module that is in its monitoring mode.

In another form of the method of the present disclosure, the transmit signal of an additional sensor module that is received by a sensor module in monitoring mode undergoes quadrature demodulation in order to obtain corresponding information on the magnitude and phase of the received transmit signal. The transmit signal received can hereby be shifted to the baseband, for example through the selection of a suitable mixed frequency, so that the intensity of the received transmit signal or other characteristic qualities of the received transmit signal can be analyzed in a simple manner by means of simple signal processing. This also enables simple plausibilization of the received transmit signal. For example, the amplitude in particular of the received transmit signal can be subjected to a plausibility test, in order to exclude the possibility that the wrong transmit signals are used for synchronization, for example signals from sensor modules of other motor vehicles or other systems found in the vicinity of the inventive radar system.

In some forms, a plurality of sensor modules, each of which is in its monitoring mode, can simultaneously receive transmit signals emitted by an additional sensor module, in order to receive information on the operating state of the additional sensor module. This means that it is also possible, using the inventive method, for a plurality of not-yet-synchronized sensor modules to simultaneously monitor the transmit signal of an adjacent sensor module, and synchronize themselves with the operation of this sensor module.

In another form, a radar system for use with a motor vehicle is provided, which has at least one first sensor module having a first detection range and at least one second sensor module having a second detection range. The first detection range at least partially overlaps the second detection range. The first sensor module, in a monitoring mode, is configured to receive a transmit signal emitted by the second sensor module to receive information on the operating state of the second sensor module.

In yet another form, a control unit for a radar system for use in a motor vehicle is provided. The radar system has at least one first sensor module having a first detection range and at least one second sensor module having a second detection range. The first detection range at least partially overlaps the second detection range, and the first sensor module, in a monitoring mode, is configured to receive a transmit signal emitted by the second sensor module to receive information on the operating state of the second sensor module. The control unit is configured to synchronize the first and second sensor modules.

In still another form, a computer program for a radar system for use in a motor vehicle is provided. The radar system has at least one first sensor module having a first detection range and at least one second sensor module having a second detection range. The first detection range at least partially overlaps the second detection range, and the first sensor module, in a monitoring mode, is configured to receive a transmit signal emitted by the second sensor module to receive information on the operating state of the second sensor module. The computer program is configured to synchronize the first and second sensor modules.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3a is a graph of a reception frequency-time curve of a sensor module according to the principles of the present invention;

FIG. 3b is a graph of a transmit signal frequency-time curve according to the principles of the present invention;

FIG. 3c is a graph of a signal-time curve of a signal that is received from a sensor module in its monitoring mode when analyzing the transmit signal of an adjacent sensor module, in accordance with the principles of the present invention; and FIG. 4 a simplified block diagram of another radar system, according to the principles of the present invention.

DETAILED DESCRIPTION

The following description is merely exemplary in nature and is not intended to limit the present disclosure, application, or uses.

Figure 1:
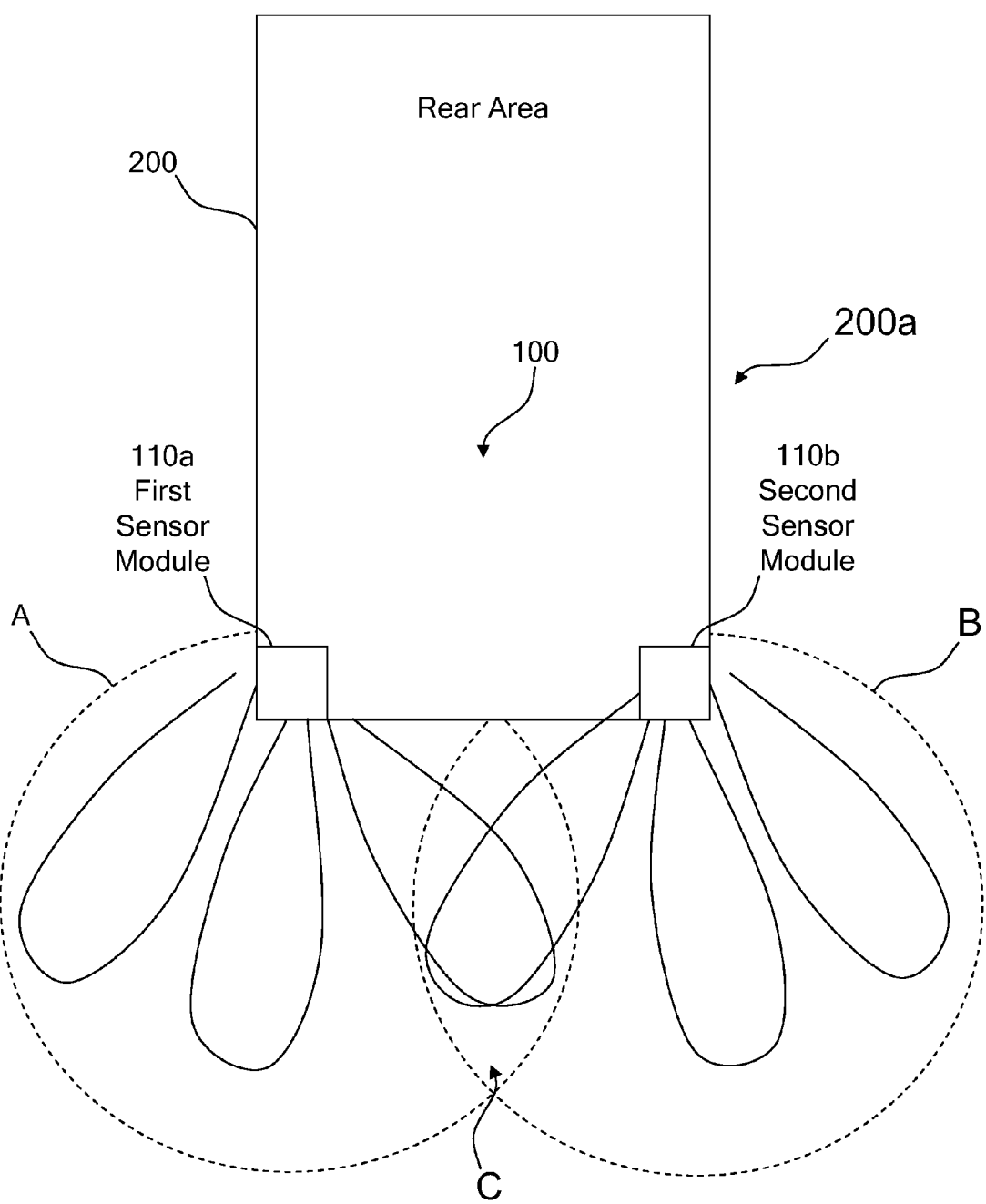
FIG. 1 is a schematic diagram of an inventive radar system in accordance with the principles of the present invention.

FIG. 1 is a schematic depiction of a radar system 100. The radar system 100 features a first sensor module 110a and a second sensor module 110b. As can be seen in FIG. 1, the sensor modules 110a, 110b are arranged in a rear area 200a of a motor vehicle indicated by the rectangle 200.

Each sensor module 110a, 110b features a radar sensor, not depicted, which is able to transmit and receive radar signals. In some forms, each of the radar sensors or their antennas features a controllable directional pattern, and in this way can produce comparatively narrow main lobes in order to respectively monitor only a partial area of the detection range A, B that is assigned to the respective sensor module 110a, 110b. In FIG. 1, in order to illustrate this circumstance, as an example, three possible main lobes are indicated for the radar sensor of the first sensor module 110a, and three possible main lobes are indicated for the radar sensor of the second sensor module 110b.

The respective radar sensor can preferably adjust one of the three main lobes and sweep it over its entire detection range A, B, so that each partial area of the respective entire detection area A, B is cyclically covered by one main lobe.

According to the invention, the radar sensors or their respective sensor modules 110a, 110b, are designed in such a way that the detection ranges A, B of the sensor modules 110a, 110b overlap in an overlapping area designated in FIG. 1 with the reference letter C. It is thus possible that radar signals transmitted by the second sensor module 110b to the overlapping area C, for example, can be received by the first sensor module 110a. The directional diagram the directional patterns of the corresponding radar sensors assume, for example, a configuration indicated by the main lobes extending into the overlapping area C according to FIG. 1, in which configuration they cover at least one partial area of the overlapping area C.

The sensor module 110a, 110b is preferably at least intermittently in a monitoring mode, in which mode it receives a transmit signal emitted by an adjacent sensor module 110a, 110b, in order to receive information on the operating state of the adjacent sensor module 110a, 110b, and to synchronize with the adjacent sensor module 110a, 110b.

The synchronization of the sensor modules 110a, 110b with each other is described in more detail below with reference to the state diagram shown in FIG. 2. The state diagram in FIG. 2 depicts examples of several operating states of a sensor module 110a, 110b, which the module can enter during implementation of the procedure of the present disclosure.

For the purpose of further description, it is assumed that both sensor modules 110a, 110b are activated simultaneously, which occurs, for example, when the motor vehicle 200 (FIG. 1) is started by switching on the ignition.

In some forms, the sensor modules 110a, 110b, except for their installation position in the motor vehicle 200, can be configured completely identically. Accordingly, the following explanations make reference only to the first sensor module 110a, but they can also be applied directly to the second sensor module 110b and to any other additional sensor modules that might be present.

Figure 2:
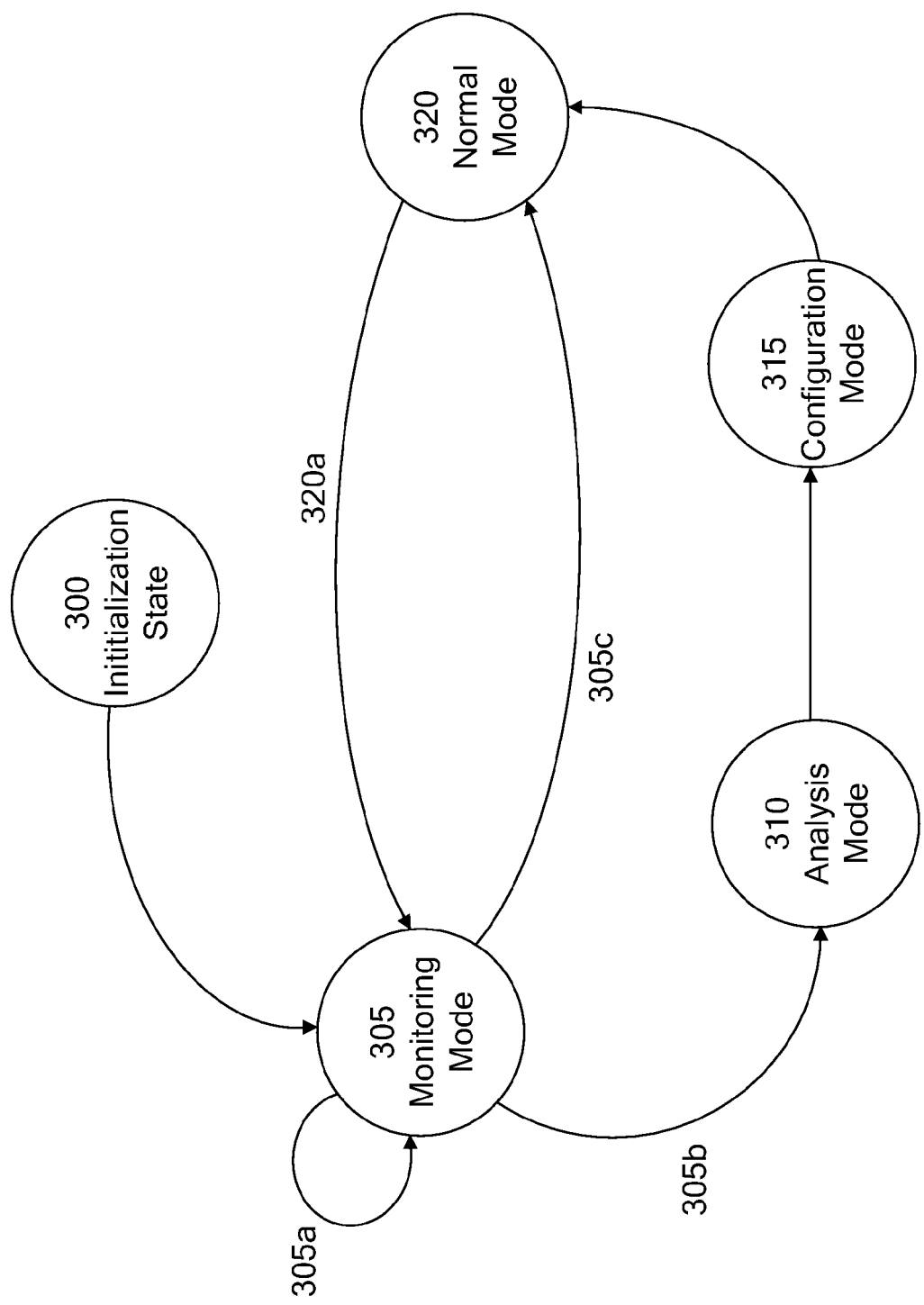
FIG. 2 is a state diagram of a method for the operation of a radar system, according to the principles of the present invention.

As can be seen from FIG. 2, the sensor module 110a enters its initialization state 300 immediately after activation. After completion of the corresponding initialization processes, which for example might include an activation of the radar sensor contained in the sensor module 110a, a calibration of additional components, and/or activation of a local control unit (not shown) of the sensor module 110a or the like, by way of example, the sensor module 110a enters the monitoring mode 305.

In the monitoring mode 305, the radar sensor of the sensor module 110a is configured in such a way that it encompasses at least one section of the overlapping area C, indicated in FIG. 1, which may be accomplished, for example, by adjusting one of the main lobes directed at the overlapping area C. The sensor module 110a is accordingly able to receive transmit signals transmitted by the adjacent sensor module 110b to the overlapping area C.

The first sensor module 110a remains in the monitoring mode 305 until it has actually received a transmit signal emitted by the adjacent sensor module 110b. This circumstance is indicated by the status transition 305a in FIG. 2.

After the sensor module 110a, in its monitoring mode 305, receives a transmit signal originating from the adjacent sensor module 110b, it shifts from the monitoring mode 305 via the status transition 305b into an analysis mode 310, in which it analyzes the received transmit signal from the second sensor module 110b in order to receive information on the operating state of the second sensor module 110b.

After completing this analysis, the sensor module 110a leaves the analysis mode 310 and shifts to the configuration mode 315, in which it configures its radar sensor according to the analysis 310 and synchronizes with the operation of the sensor module 110b. This synchronization can, for example, include the calibration of a local time base, such as a timer of a local control unit, etc. and makes it possible, for example, to calculate the future time intervals in the sensor module 110a, in which the adjacent sensor module 110b will transmit its transmit signal to the overlapping area C.

Finally, after successful synchronization, the first sensor module 110a shifts to the normal mode 320, in which it periodically changes the directional patterns of its radar sensor in order to cyclically monitor partial areas of the detection range A for obstacles or other objects, for example.

In some forms, by virtue of the synchronization of the sensor module 110a with the operation of the adjacent sensor module 110b, the monitoring of the detection range A by the sensor module 110a is particularly advantageous in that the sensor module 110a monitors the overlapping area C, for example, only at times when the adjacent sensor module 110b is not monitoring the overlapping area C as well, so that the possibility of reciprocal interference by the sensor modules 110a, 110b is excluded during their normal operation 320.

If, however, the first sensor module 110a, during its normal operation 320, over time loses its synchronization with the adjacent sensor module 110b, it can occur that the sensor module 110a monitors the overlapping area C at the same time as the adjacent sensor module 110b monitors the overlapping area C. In that case, there may be undesirable crosstalk between the sensor modules 110a, 110b.

Undesirable crosstalk of this kind is recognized, for example, by the first sensor module 110a during analysis of the radar signals emitted or received during normal operation 320, whereupon the first sensor module 110a leaves normal operation 320 and once again enters the monitoring mode 305 by means of the status transition 320a. Then, as described above, there is renewed synchronization, according to the method of the present disclosure, of the first sensor module 110a with the second sensor module 110b.

Alternatively to recognition of the undesirable crosstalk by the first sensor module 110a, such recognition can also be performed by the second sensor module 110b, which then, in the same manner, shifts into its monitoring mode 305.

However, in some forms, in order to prevent both sensor modules 110a, 110b from simultaneously returning to the monitoring mode 305 during cyclical monitoring of partial areas of the respective detection range A, B, and after detection of crosstalk, the pertinent sensor module 110a, 110b, will initially remain for a randomly determined holding time or number of cycles in its normal operation 320, before it shifts into monitoring mode 305. In this way, it is ensured that the sensor module 110a that shifts first in a randomly determined manner via status transition 320a into its monitoring mode 305 can effect synchronization once again, while the other sensor module 110b remains in its normal operation 320.

In another form of the present disclosure, the sensor module 110a, after entering the monitoring mode 305, can also, for example, remain in the monitoring mode 305 for a randomly determined holding time rather than for a constant holding time. If no transmit signal originating from the adjacent sensor module 110b is received or detected during this holding time, the corresponding sensor module 110a passes directly from the monitoring mode 305 into normal operation 320, as in the status transition 305c. This ensures, for example, that the relevant sensor module 110a, if all adjacent sensor modules 110b malfunction, shifts into normal operation 320, even without receiving a transmit signal from an adjacent sensor module 100b, thereby maintaining at least partial operation of the radar system 100 (FIG. 1).

By means of the status transition 305c after the corresponding, randomly determined holding time, it is also ensured that one of the sensor modules 110b will be highly likely to enter normal operation 320 after initialization 300, without having first performed synchronization according to the present disclosure. This allows the additional sensor modules 110a of the radar system 100 to perform the synchronization relative to the sensor module 110b, which has already been described several times above.

By way of example, the synchronization or analysis 310 (FIG. 2) of the transmit signal received from an adjacent sensor model is described in more detail below with reference to the FIGS. 3a to 3c.

FIG. 3a shows the mixed frequency-time curve of a mixer contained in the radar sensor of the sensor module 110a. As can be seen from FIG. 3a, the mixer exhibits a temporally constant mixed frequency f3 when the sensor module 110a is in its monitoring mode.

FIG. 3b shows the time curve of an FMCW (frequency modulated continuous wave), also termed a chirp signal, as periodically emitted by the sensor module 110b, also when transmitting to the overlapping area C (FIG. 1). As can be seen from FIG. 3b, the transmit signal exhibits a time-linear change in its frequency, starting with a start frequency f1 up to a stop frequency f2. This means that during the entire duration of emission T=t3−t1, the frequency of the transmit signal emitted by the sensor module 110b will vary in a temporally linear manner from the start frequency f1 to the stop frequency f2. This ensures that the radar sensor of the first sensor module 110a, with its mixer that is operated constantly at the mixed frequency f3 (FIG. 3a) recognizes a reception signal corresponding to the transmit signal at exactly the point where the frequency of the chirp transmit signal of the sensor module 110b shown in FIG. 3b is identical to the mixed frequency f3 of the mixer. According to the chirp transmit signal shown in FIG. 3b, this is the case at the point in time t2; in other words, at the point in time t2, the chirp transmit-signal according to FIG. 3b exhibits the same frequency f3 as the signal used by the mixer to mix the received transmit signal.

Accordingly, in the sensor module 110a, through analysis of the chirp transmit signal, a signal will be received that is comparable to the analysis signal shown in FIG. 3c, which reaches a maximum at the point in time t=t2. This means that through the above described analysis of the FMCW or the chirp transmit-signal sent by the sensor module 110b, with knowledge of the reception time t2 and the mixed frequency f3 used by its mixer, the first sensor module 110a can deduce the operating state of the adjacent sensor module 110b from the known characteristics T=t3−t1, f1, f2 of the FMCW transmit signal (FIG. 3b).

In particular, given knowledge of the so-called chirp duration T, that is, the time for which the transmit signal is transmitted with time-linear frequency modulation, the start time point t1, for example, of the chirp transmit signal or the end time point t3=t1+T can also be obtained.

For this purpose, the following equivalence will be exploited to especially great advantage:

$$\frac{f2-f1}{f3-f1} = \frac{T}{t2-t1} = \frac{t3-t1}{t2-t1}.$$

In this way, the first sensor module 110a is able to define the start times t1 for its own transmit signals depending on the previously obtained parameters of the transmit signals emitted by the sensor module 110b.

Given a knowledge of the algorithms on the basis of which the main lobes of the respective radar sensors of the sensor modules 110a, 110b for example can be changed or swept over the detection range A, B (FIG. 1), the operation of a radar sensor of a specific sensor module 110a for example can be controlled in such a way that no undesirable crosstalk occurs due to a temporal conjuncture of the main lobes of different sensor modules 110a, 110b in the overlapping area C.

Separate data lines between the sensor modules for transmitting synchronization signals, as provided in conventional systems, are therefore not necessary in the radar system 100 or the operating procedure of the present disclosure.

For example, in some forms of the present disclosure, a potentially existing data bus 130, as provided in the schematically depicted radar system 100 shown in FIG. 4 for communication by the individual sensor modules 110a, 110b with a central control unit 120, is also not used for synchronization purposes, so that the bus load of the data bus 130 is not increased, and accordingly, remaining data communication can take place on the bus reliably and without interference. In addition to the central control unit 120, corresponding local control units (not shown) that are comparable to the central control units 120 can also be advantageously provided in each sensor module 110a, 110b. The local control units control, for example, the radar sensor or its antennas, as well as the analysis of the transmit signals and the operation of a sensor module 110a, 110b in general.

In addition, or alternatively, to the time-linear frequency modulation of the transmit signal shown in FIG. 3b, it is also possible to use non-linear chirp signals or so-called stepped FMCW, up-down-FMCW, or other general FSK signals or combinations thereof as transmit signals.

Quite generally, every conceivable transmit signal used by a sensor module 110b to realize the main functionality of a sensor module 110b, such as obstacle recognition and similar functions, may be used by a sensor module 110a in monitoring mode 305 (FIG. 2) to synchronize with the sensor module 110b, so that even when synchronization is lacking, at least a restricted function of the radar system 100 is present.

Alternatively, however, a sensor module 110a, 110b can emit, in a targeted manner, a transmit signal containing, for example, special synchronization information or other data to the overlapping area C, in order to transmit the corresponding information to a sensor module that receives this transmit signal.

In some forms, the transmit signal from an adjacent sensor module 110b that is received by a sensor module 110a in its monitoring mode 305 can be subjected to quadrature demodulation, in order to obtain corresponding information on the magnitude and phase of the received transmit signal. Here the received transmit signal can, through selection of a suitable mixed frequency f3, for example, be shifted directly to a baseband, so that during signal processing that is not very complex, the intensity of the received transmit signal, for example, or other characteristic qualities of the received transmit signal can be examined. The intensity of the received transmit signal can also be identified through conventional demodulation, whereby, accordingly, no quadrature demodulator is required.

In some forms, an amplitude of the received transmit signal, or a demodulated signal corresponding to it, may also be analyzed in order by means of a plausibility test to prevent erroneous transmit signals being analyzed for synchronization, said signals originating, for example, from the sensor modules of other motor vehicles or other systems located in the vicinity of the radar system 100.

By employing the method of the present disclosure, a plurality of sensor modules in their monitoring mode can also simultaneously receive a transmit signal emitted by an additional sensor module in order to obtain information on the operating state of the additional sensor module. Thus, at the same time, a plurality of sensor modules that are not yet synchronized can monitor the transmit signal of an adjacent sensor module and synchronize with the operation of this sensor module.

If a sensor module 110a is provided with a radar sensor that has a separate transmitter and a separate receiver, the sensor module 110a can accordingly realize, even during its normal operation 320, the functionality that was described above in connection with the monitoring mode 305, and that ensures that the sensor module 110a can receive and analyze, for the purpose of synchronization, transmit signals emitted by an adjacent sensor module 110b. In this case, different transmit signals, such as transmit signals with a different chirp duration or frequency modulation are used, for example, by the two sensor modules 110a, 110b, in order to facilitate the corresponding analysis.

The method of the present disclosure may be realized in the form of a computer program that is stored, for example in an electronic memory such as an EEPROM, for example, and which can be loaded into the control unit 120 (FIG. 4) or a local control unit of a sensor module 110a, 110b.

Depending on the system bandwidth of a receiver contained in the sensor module, it can also be sufficient for synchronization, and in particular for avoiding crosstalk between adjacent sensor modules, to emit the chirp signals of the adjacent sensor modules with a pre-definable time shift with respect to one another, i.e. in this case, both sensor modules can transmit simultaneously to the overlapping area C, and their chirp signals, depending on the pre-definable time shift, can overlap at least in part.

This is made possible because with the appropriate selection of a time shift, the chirp signal of one sensor module, with this time shift, already exhibits a sufficiently great frequency separation from the chirp signal of the other sensor module. In this case, the chirp signal of the one sensor module no longer lies within a receiving-frequency range currently being surveyed by the other sensor module, which in turn is dependent on the current frequency of its own delayed chirp signal. The choice of the pre-definable time shift therefore depends on both the frequency-change velocity of the chirp signal used and on the system bandwidth of the receiver.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A method of operating a radar system that features at least one first sensor module and at least one second sensor module, the method comprising:
   providing a first detection range of the at least one first sensor module and a second detection range of the at least second sensor module, the first detection range at least partially overlapping with the second detection range; and
   in a monitoring mode, the at least one first sensor module receiving a transmit signal emitted by the at least one second sensor module to receive information on the operating state of the at least one second sensor module.

2. The method according to claim 1, further comprising operating the at least one first sensor module in accordance with the information received on the operating state of the at least one second sensor module.

3. The method according to claim 1, wherein the transmit signal is a FMCW signal whose frequency varies temporally between a start frequency and a stop frequency.

4. The method according to claim 3, further comprising providing the at least one first sensor module with a receiver, wherein in the monitoring mode, the receiver is configured to analyze a signal only if it has a frequency that lies between the start frequency of the FMCW signal and the stop frequency of the FMCW signal.

5. The method according to claim 1, further comprising synchronizing the at least one first sensor module with the at least one second sensor module depending on a reception time and a frequency of the transmit signal received from the at least one second sensor module.

6. The method according to claim 1, further comprising providing at least one of the at least one first sensor module and the at least one second sensor module with a radar sensor having a controllable directional pattern.

7. The method according to claim 1, further comprising periodically shifting the at least one first sensor module into the monitoring mode.

8. The method according to claim 1, further comprising shifting the at least one first sensor module into the monitoring mode immediately after activation.

9. The method according to claim 1, further comprising shifting the at least one first sensor module out of the monitoring mode after one of a pre-definable holding time and a randomly selected holding time.

10. The method according to claim 1, further comprising measuring a distance between the at least one second sensor module and an object found within the second detection range by using the transmit signal emitted by the at least one second sensor module in the at least one second sensor module.

11. The method according to claim 1, wherein the transmit signal contains synchronization information within the first detection range.

12. The method according to claim 1, further comprising subjecting the transmit signal to a quadrature demodulation in the at least one first sensor module.

13. The method according to claim 1, wherein the at least one first sensor module is provided as a plurality of first sensor modules.

14. A radar system for use with a motor vehicle, the radar system comprising:
   at least one first sensor module having a first detection range; and
   at least one second sensor module having a second detection range, the first detection range at least partially overlapping the second detection range, the at least one first sensor module, in a monitoring mode, being configured to receive a transmit signal emitted by the at least one second sensor module to receive information on the operating state of the at least one second sensor module.

15. The radar system of claim 14, wherein the at least one first sensor module further comprises a receiver, the transmit signal being a FMCW signal whose frequency varies temporally between a start frequency and a stop frequency, the receiver being configured to analyze a signal only if it has a frequency which lies between the start frequency of the FMCW signal and the stop frequency of the FMCW signal.

16. The radar system of claim 14, wherein at least one of the at least one first and second sensor modules comprises a radar sensor with a controllable directional pattern.

17. The radar system of claim 14, wherein the transmit signal contains synchronization information within the first detection range.

18. The radar system of claim 14, wherein the at least one first sensor module is a plurality of first sensor modules.

19. A control unit for a radar system for use in a motor vehicle, the radar system comprising at least one first sensor module having a first detection range and at least one second sensor module having a second detection range, the first detection range at least partially overlapping the second detection range, the at least one first sensor module, in a monitoring mode, being configured to receive a transmit signal emitted by the at least one second sensor module to receive information on the operating state of the at least one second sensor module, the control unit being configured to synchronize the at least one first and second sensor modules.

20. A computer program product in a computer-readable medium for a radar system for use in a motor vehicle, the radar system comprising at least one first sensor module having a first detection range and at least one second sensor module having a second detection range, the first detection range at least partially overlapping the second detection range, the at least one first sensor module, in a monitoring mode, being configured to receive a transmit signal emitted by the at least one second sensor module to receive information on the operating state of the at least one second sensor module, the computer program product being configured to synchronize the at least one first sensor module with the at least one second sensor module.

* * * * *